United States Patent
Mochigi et al.

(10) Patent No.: US 10,347,428 B2
(45) Date of Patent: Jul. 9, 2019

(54) MULTILAYER CERAMIC CAPACITOR

(71) Applicant: TAIYO YUDEN CO., LTD., Taito-ku, Tokyo (JP)

(72) Inventors: Masaki Mochigi, Takasaki (JP); Yousuke Nakada, Takasaki (JP); Shinichi Tsunoda, Takasaki (JP); Yasuyuki Mashimo, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/635,118

(22) Filed: Jun. 27, 2017

(65) Prior Publication Data
US 2018/0012703 A1    Jan. 11, 2018

(30) Foreign Application Priority Data
Jul. 5, 2016 (JP) .................... 2016-133660

(51) Int. Cl.
*H01G 4/30* (2006.01)
*H01G 4/12* (2006.01)
(Continued)

(52) U.S. Cl.
CPC ............... *H01G 4/30* (2013.01); *H01G 4/008* (2013.01); *H01G 4/012* (2013.01);
(Continued)

(58) Field of Classification Search
CPC .......... H01G 4/30; H01G 4/008; H01G 4/232; H01G 4/1218
See application file for complete search history.

(56) References Cited

U.S. PATENT DOCUMENTS

| 5,268,342 A | 12/1993 | Nishiyama et al. |
| 5,812,363 A | 9/1998 | Kuroda et al. |

(Continued)

FOREIGN PATENT DOCUMENTS

| JP | 61162037 U1 | 10/1986 |
| JP | H04171708 A | 6/1992 |

(Continued)

OTHER PUBLICATIONS

Non-Final Office Action issued by U.S. Patent and Trademark Office, dated May 25, 2018, for related U.S. Appl. No. 15/604,393.
(Continued)

*Primary Examiner* — Nathan Milakovich
(74) *Attorney, Agent, or Firm* — Law Office of Katsuhiro Arai

(57) ABSTRACT

A multilayer ceramic capacitor includes: a multilayer structure having an internal electrode and a dielectric layer alternately stacked; external electrodes provided on a first and second faces of the multilayer structure, wherein $t1^2 \times L1/N$ is equal to or more than 0.1, when a distance between a first edge positioned at outermost of edges of the plurality of internal electrodes that are not connected to the first external electrode or the second external electrode in an array direction of the first external electrode and the second external electrode and a second edge positioned at innermost of edges of the plurality of internal electrodes that are not connected to the first external electrode or the second external electrode in the array direction is L1 (mm), each thickness of the plurality of dielectric layers is t1 (μm), and a stack number of the plurality of dielectric layers is N.

7 Claims, 9 Drawing Sheets

(51) Int. Cl.
*H01G 4/012* (2006.01)
*H01G 4/232* (2006.01)
*H01G 4/008* (2006.01)

(52) U.S. Cl.
CPC .......... *H01G 4/1227* (2013.01); *H01G 4/232* (2013.01); *H01G 4/0085* (2013.01); *H01G 4/1218* (2013.01)

(56) References Cited

U.S. PATENT DOCUMENTS

| | | | |
|---|---|---|---|
| 5,835,338 A | 11/1998 | Suzuki et al. | |
| 6,473,292 B1 | 10/2002 | Yoshida et al. | |
| 7,307,829 B1 | 12/2007 | Devoe et al. | |
| 7,436,650 B2* | 10/2008 | Oguni | H01G 4/012 |
| | | | 361/306.1 |
| 7,715,172 B2* | 5/2010 | Kawasaki | H01G 4/232 |
| | | | 361/303 |
| 7,859,821 B2* | 12/2010 | Shimizu | H01G 4/30 |
| | | | 361/303 |
| 9,318,263 B2* | 4/2016 | Seo | H01G 4/12 |
| 9,595,386 B2 | 3/2017 | You et al. | |
| 9,653,214 B2* | 5/2017 | Hattori | H01G 4/30 |
| 2002/0041061 A1 | 4/2002 | Nomura et al. | |
| 2012/0307418 A1 | 12/2012 | Kim et al. | |
| 2012/0327556 A1 | 12/2012 | Ahn et al. | |
| 2013/0135787 A1 | 5/2013 | Lim et al. | |
| 2014/0177127 A1 | 6/2014 | Kim | |
| 2014/0185186 A1* | 7/2014 | Lee | H01G 4/30 |
| | | | 361/303 |
| 2014/0362492 A1 | 12/2014 | Lee et al. | |
| 2017/0352483 A1* | 12/2017 | Mochigi | H01G 4/012 |
| 2018/0374643 A1* | 12/2018 | Inomata | H01G 4/2325 |

FOREIGN PATENT DOCUMENTS

| | | |
|---|---|---|
| JP | H09260202 A | 10/1997 |
| JP | H10335168 A | 12/1998 |
| JP | 2000040634 A | 2/2000 |
| JP | 2000124057 A | 4/2000 |
| JP | 2000306761 A | 11/2000 |
| JP | 2002184648 A | 6/2002 |
| JP | 2004022859 A | 1/2004 |
| JP | 2006013245 A | 1/2006 |
| JP | 2009200092 A | 9/2009 |

OTHER PUBLICATIONS

Final Office Action issued by US. Patent and Trademark Office, dated Oct. 18, 2018, for U.S. Appl. No. 15/604,393.
A Notification of Reasons for Refusal issued by the Japanese Patent Office, dated Feb. 19, 2019, for related Japanese application No. 2016-113924. (8 pages).
A Notification of Reasons for Refusal issued by the Japanese Patent Office, dated Jan. 8, 2019, for related Japanese application No. 2016-113924.
Non-Final Office Action issued by U.S. Patent and Trademark Office, dated Jan. 10, 2019, for related U.S. Appl. No. 15/604,393.

* cited by examiner

FIG. 8

| | L [mm] | W [mm] | T [mm] | Li [mm] | L1 [mm] | EM [mm] | t1 [μm] | N | [(t1)²×L1]/N | BDV [V] |
|---|---|---|---|---|---|---|---|---|---|---|
| EXAMPLE 1 | 24 | 59 | 4.1 | 18 | 1.6 | 2.2 | 28.4 | 120 | 10.75 | 1669 |
| EXAMPLE 2 | 34 | 39 | 4.5 | 28 | 1.6 | 2.2 | 13.3 | 204 | 1.39 | 818 |
| EXAMPLE 3 | 34 | 39 | 4.5 | 28 | 1.6 | 2.2 | 26.6 | 108 | 10.48 | 1455 |
| EXAMPLE 4 | 34 | 39 | 4.5 | 28 | 1.6 | 2.2 | 39.9 | 72 | 35.38 | 2120 |
| EXAMPLE 5 | 34 | 39 | 4.5 | 28 | 1.6 | 2.2 | 61.3 | 64 | 93.94 | 3171 |
| EXAMPLE 6 | 24 | 39 | 4.6 | 18 | 2.2 | 2.2 | 15.5 | 213 | 2.48 | 750 |
| EXAMPLE 7 | 24 | 29 | 3.4 | 18 | 1.6 | 2.2 | 27.3 | 83 | 14.37 | 1365 |
| EXAMPLE 8 | 14 | 19 | 3.3 | 11 | 1.3 | 0.85 | 26.1 | 68 | 13.02 | 1441 |
| EXAMPLE 9 | 14 | 19 | 4.1 | 11 | 1.3 | 0.85 | 35.6 | 81 | 20.34 | 1475 |
| COMPARATIVE EXAMPLE 1 | 24 | 59 | 4.1 | 18 | 0.01 | 3.0 | 28.4 | 120 | 0.07 | 435 |
| COMPARATIVE EXAMPLE 2 | 34 | 39 | 4.5 | 28 | 0.01 | 3.0 | 13.3 | 204 | 0.01 | 549 |

…

MULTILAYER CERAMIC CAPACITOR

CROSS-REFERENCE TO RELATED APPLICATION

This application is based upon and claims the benefit of priority of the prior Japanese Patent Application No. 2016-133660, filed on Jul. 5, 2016, the entire contents of which are incorporated herein by reference.

FIELD

A certain aspect of the present invention relates to a multilayer ceramic capacitor.

BACKGROUND

There is known a technology in which an overlap area of internal electrodes is enlarged in order to improve a withstand voltage of a multilayer ceramic capacitor (see Japanese Patent Application Publication No. 2000-306761). There is known a technology in which sides of a plurality of internal electrodes do not coincide with each other in a stack direction in order to improve a withstand voltage (see Japanese Patent Application Publication No. 2009-200092).

SUMMARY OF THE INVENTION

However, the withstand voltage is not sufficiently improved, in the technologies.

According to an aspect of the present invention, there is provided a multilayer ceramic capacitor comprising: a multilayer structure in which each of a plurality of internal electrodes and each of a plurality of dielectric layers are alternately stacked; a first external electrode that is provided on a first face of the multilayer structure and is connected to a subset of the plurality of internal electrodes; and a second external electrode that is provided on a second face of the multilayer structure and is connected to another subset of the plurality of internal electrodes, the second face facing the first face, wherein $t1^2 \times L1/N$ is equal to or more than 0.1, when a distance between a first edge that is an outermost edge of edges of the plurality of internal electrodes that is not connected to the first external electrode or the second external electrode in an array direction of the first external electrode and the second external electrode and a second edge that is an innermost edge of edges of the plurality of internal electrodes that is not connected to the first external electrode or the second external electrode in the array direction is L1 (mm), each thickness of the plurality of dielectric layers is t1 (μm), and a stack number of the plurality of dielectric layers is N.

BRIEF DESCRIPTION OF THE DRAWINGS

FIG. 8 illustrates each size of each sample of examples and comparative examples.

DETAILED DESCRIPTION

A description will be given of an embodiment with reference to the accompanying drawings.

Embodiment

Figure 1:
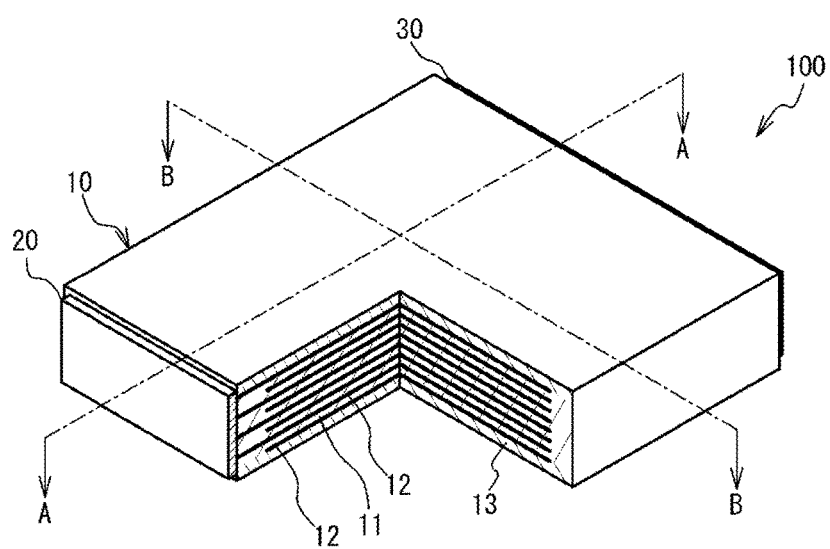
FIG. 1 illustrates a partial perspective view of a multilayer ceramic capacitor in accordance with an embodiment.
Figure 2:
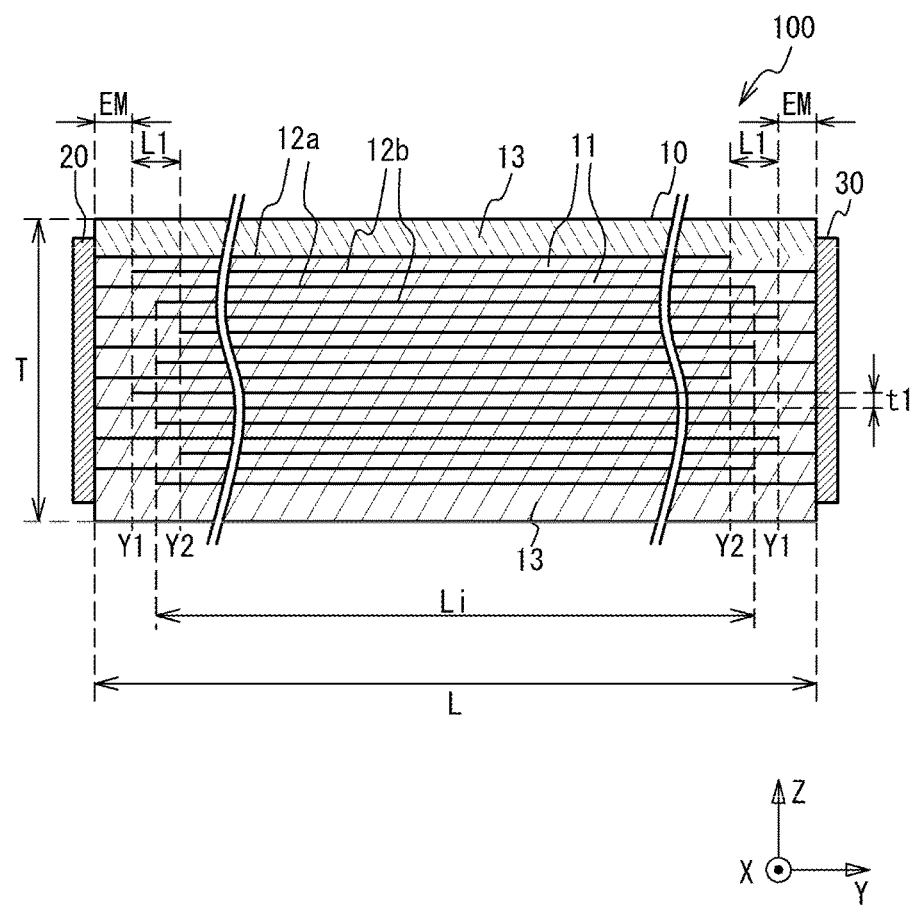
FIG. 2 illustrates a cross sectional view taken along a line A-A of FIG. 1.
Figure 3:
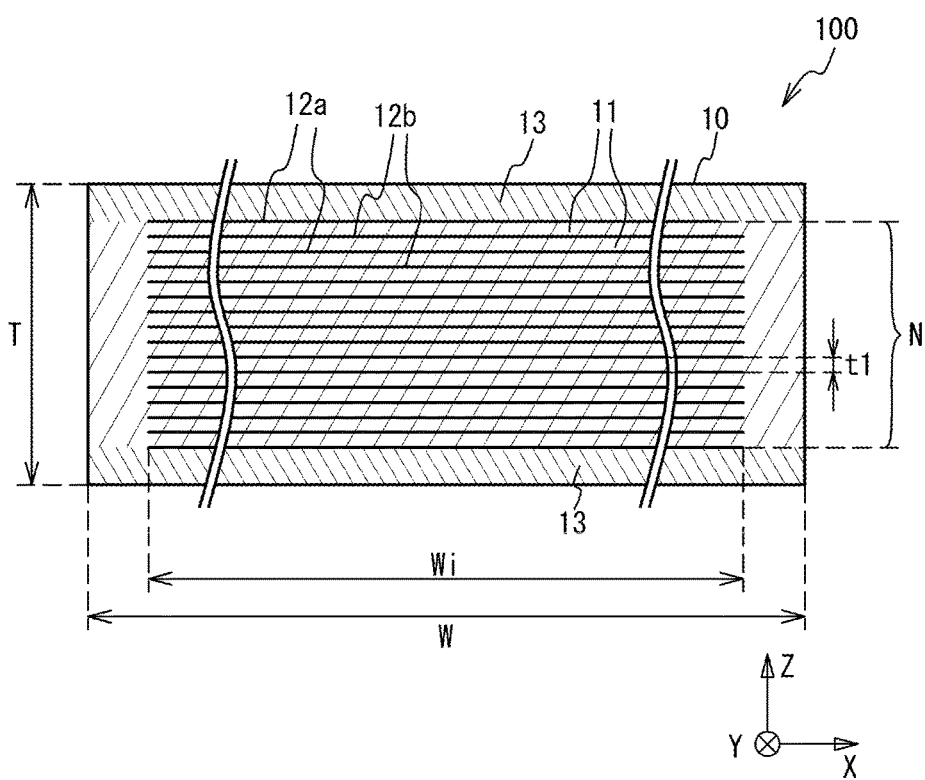
FIG. 3 illustrates a cross sectional view taken along a line B-B of FIG. 1.

A description will be given of a multilayer ceramic capacitor. FIG. 1 illustrates a partial perspective view of a multilayer ceramic capacitor in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, a multilayer ceramic capacitor 100 includes a multilayer structure 10 having a rectangular parallelepiped shape, and a pair of external electrodes 20 and 30 that are provided at edge faces of the multilayer structure 10 facing each other. The multilayer structure 10 has a structure designed to have dielectric layers 11 and internal electrodes 12 alternately stacked. The dielectric layer 11 includes ceramic material acting as a dielectric body. The stack direction of the dielectric layer 11 and the internal electrode 12 is a Z-direction. The facing direction of the external electrodes 20 and 30 is a Y-direction. A direction vertical to the Y-direction and the Z-direction is an X-direction.

End edges of the internal electrodes 12 are alternately exposed to an end face of the multilayer structure 10 on which the external electrode 20 is provided and an end face of the multilayer structure 10 on which the external electrode 30 is provided. Thus, the internal electrodes 12 are alternately conducted to the external electrode 20 and the external electrode 30. In FIG. 2 and FIG. 3, an internal electrode 12a is electrically connected to the external electrode 20. An internal electrode 12b is electrically connected to the external electrode 30. Thus, the multilayer ceramic capacitor 100 has a structure in which a plurality of ceramic capacitors are stacked. And, both edge faces of the multilayer structure 10 in the stack direction of the dielectric layer 11 and the internal electrode 12 are covered by cover layers 13. For example, material of the cover layer 13 is the same as that of the dielectric layer 11. As illustrated in FIG. 3, the edge of the internal electrode 12a is different from the edge of the internal electrode 12b in the X-direction.

A main component of the external electrodes 20 and 30 and the internal electrode 12 is a metal such as nickel (Ni), copper (Cu), tin (Sn), silver (Ag), palladium (Pd), gold (Au), or platinum (Pt). The dielectric layer 11 is mainly composed of a ceramic material having a perovskite structure expressed by a general expression $ABO_3$. The ceramic material of the perovskite structure of the dielectric layer 11 may be $BaTiO_3$ (barium titanate), $SrTiO_3$ (strontium titanate), $CaTiO_3$ (calcium titanate), $MgTiO_3$ (magnesium titanate), $CaZrO_3$ (calcium zirconate), $CaTi_xZr_{1-x}O_3$ (calcium titanate zirconate), $BaZrO_3$ (barium zirconate), or $PbTi_xZr_{1-x}O_3$ (lead titanate zirconate: PZT). The ceramic material of the dielectric layer 11 may be $TiO_2$ (titanium oxide). The dielectric layer 11 may be made of sintered material. The dielectric layer 11 is isotropic with respect to a crystal orientation at a macro level.

The ceramic material of the perovskite structure may have an off-stoichiometric composition. First, specified additive compounds may be added to the ceramic material. The additive compound may be at least one of oxidation materials of Mg (magnesium), Mn (manganese), V (vanadium), Cr (chromium), and oxidation materials of rare-earth elements (Y (yttrium), Dy (dysprosium), Tm (thulium), Ho (holmium), Tb (terbium), Yb (ytterbium), Er (erbium), Sm (samarium), Eu (europium), Gd (gadolinium)), Co (cobalt), Li (lithium), B (boron), Na (sodium), K (potassium), and Si (silicon), or glass.

As illustrated in FIG. 2 and FIG. 3, a thickness of the multilayer structure 10 in the Z-direction is "T". A length of the multilayer structure 10 in the Y-direction is "L". A width of the multilayer structure 10 in the X-direction is "W". Each thickness of the dielectric layer 11 is "t1". An overlapping width of the internal electrode 12a and the internal electrode 12b is "Li". In the Y-direction, an outermost edge of the internal electrodes 12 is a position "Y1". In the Y-direction, an innermost edge of the internal electrodes 12 is a position "Y2". A distance between the position "Y1" and the position "Y2" is a deviation amount "L1". A distance from the edge of the outermost internal electrode 12 to the edge face of the multilayer structure 10 is an end margin "EM". The stack number of the dielectric layer 11 is "N".

The present inventors thought the following electrostrictive effect as a reason that a withstand voltage of a multilayer ceramic capacitor is reduced. When a voltage is applied between the internal electrode 12a and the internal electrode 12b, a tension occurs in the multilayer structure 10 because of the electrostrictive effect. A crack occurs in a region in which tension is condensed. The multilayer ceramic capacitor is broken because of the crack or the like.

Figure 4A:
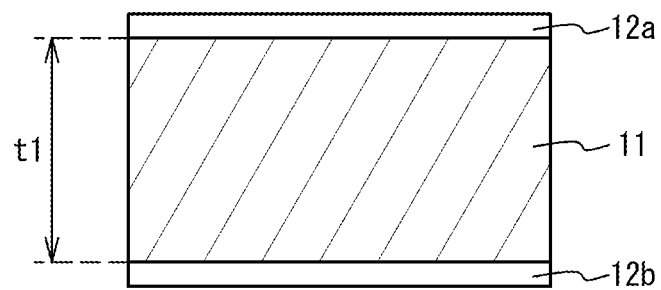
FIG. 4A and FIG. 4B illustrate one ceramic capacitor.
Figure 4B:
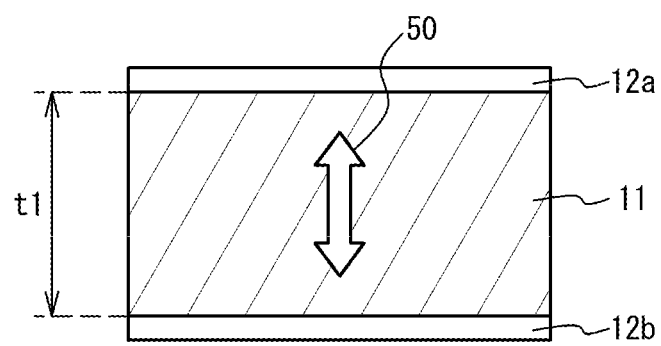

FIG. 4A and FIG. 4B illustrate one ceramic capacitor. As illustrated in FIG. 4A, the internal electrode 12a is provided over the dielectric layer 11 having a thickness "t1", and the internal electrode 12b is provided under the dielectric layer 11. As illustrated in FIG. 4B, a positive voltage is applied to the internal electrode 12a with respect to the internal electrode 12b. In this case, an electrical field is applied to the dielectric layer 11 in the stack direction. Therefore, a displacement extending in the stack direction occurs in the dielectric layer 11 because of the electrostrictive effect as indicated by an arrow 50.

Figure 5:
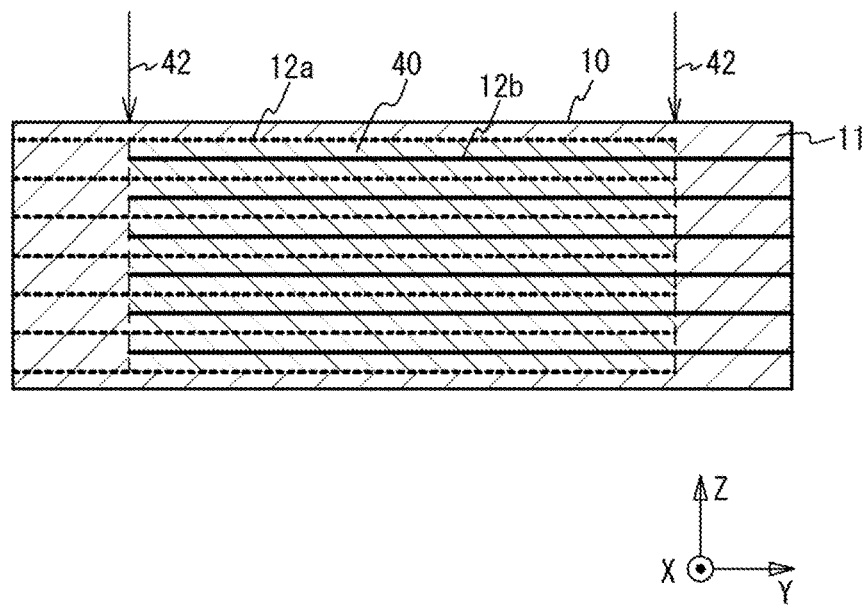
FIG. 5 illustrates a cross sectional view of a multilayer ceramic capacitor in accordance with a comparative embodiment.

FIG. 5 illustrates a cross sectional view of a multilayer ceramic capacitor in accordance with a comparative embodiment. As illustrated in FIG. 5, the internal electrode 12a connected to the external electrode 20 is illustrated by a dotted line. The internal electrode 12b connected to the external electrode 30 is illustrated by a solid line. Edges of the internal electrodes 12a in the Y-direction approximately coincide with each other. Edges of the internal electrodes 12b in the Y-direction approximately coincide with each other. A region of the dielectric layer 11 in which displacement occurs because of the electrostrictive effect is a region 40 sandwiched by the internal electrodes 12 in the Z-direction. A hatch direction of the region 40 is inverted with respect to another region of the dielectric layer 11, in order to distinguish the region 40 from another region of the dielectric layer 11. In the multilayer structure 10, tension tends to be condensed to a region in which the displacement rapidly changes. Therefore, the tension tends to be condensed to the edge of the internal electrode 12 as indicated by an arrow 42.

Figure 6:
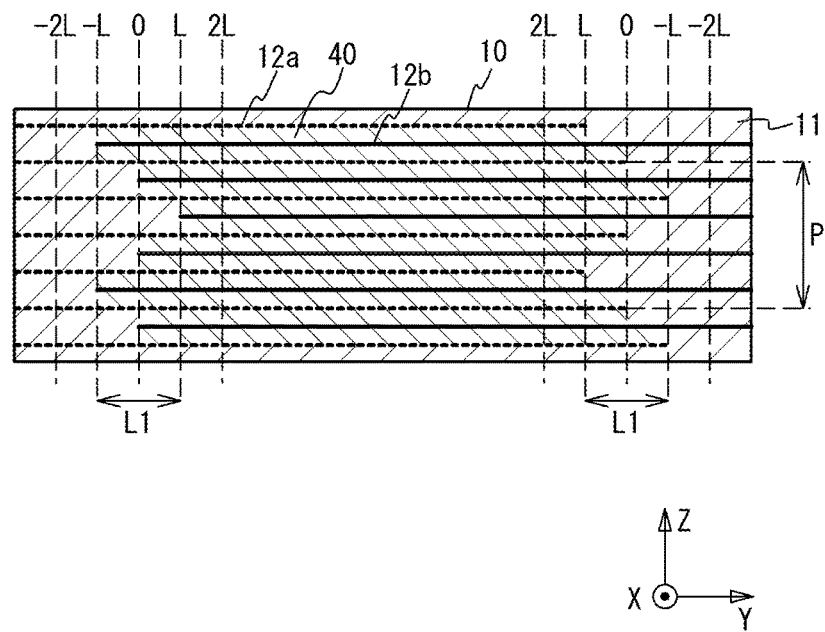
FIG. 6 illustrates a cross sectional view of a multilayer ceramic capacitor in accordance with an embodiment.

An overall displacement amount "$\Delta Dt$" of the stacked dielectric layers 11 caused by the electrostrictive effect is a displacement amount "$\Delta D$" of one dielectric layer 11 multiplied by the stack number "N" of the dielectric layer 11. That is, $\Delta Dt = \Delta D \times N$. The displacement amount "$\Delta D$" in one dielectric layer 11 is proportional to a square of electrical field intensity in the dielectric layer 11. The electric field intensity is inversely proportional to the thickness "t1" of the dielectric layer 11. That is, $\Delta D \propto 1/(t1)^2$. Therefore, $\Delta Dt \propto (t1)^2$ FIG. 6 illustrates a cross sectional view of a multilayer ceramic capacitor in accordance with the embodiment. As illustrated in FIG. 6, edges of the internal electrodes 12a in the Y-direction are different from each other. And edges of the internal electrodes 12b in the Y-direction are different from each other. In this example, the position of the edges of the internal electrodes 12a in the Y-direction is changed in three steps that are 0, +L, 0 and −L. The position of the edges of the internal electrodes 12b in the Y-direction is changed in three steps that are 0, +L, 0 and −L. One period "P" includes eight dielectric layers 11. In this case, the deviation amount "L1" is 2L.

In one period "P", the number of the dielectric layers 11 included in the positions −2L, −L, 0, L and 2L is zero, one, six, eight and eight. Therefore, the overall displacement amount "$\Delta Dt$" in each position is as the follows.
the position −2L: 0
the position −L: $(2/8) \times N \times \Delta D$
the position 0: $(6/8) \times N \times \Delta D$
the position L: $(8/8) \times N \times \Delta D$
the position 2L: $(8/8) \times N \times \Delta D$ The stress corresponds to an inclination of the displacement amount with respect to the position. Therefore, the stress between each position is as follows.
the position −2.5L: 0
the position −1.5L: $(2/8) \times N \times \Delta D/L$
the position −0.5L: $(4/8) \times N \times \Delta D/L$
the position 0.5L: $(2/8) \times N \times \Delta D/L$
the position 1.5L: 0

In this example, the position at which the stress becomes the maximum is −0.5 L. And, the maximum value of the stress is proportional to "N" and "$\Delta D$" and is inversely proportional to "L" (that is, L1). "$\Delta D$" is inversely proportional to $(t1)^2$. Therefore, the maximum value of the stress is proportional to "N" and is inversely proportional to "L" (that is, L1) and $(t1)^2$. That is, the maximum value of the stress is proportional to $N/[(t1)^2 \times L1]$. The withstand voltage BDV of the multilayer ceramic capacitor is as follows when the withstand voltage BDV is inversely proportional to the maximum value of the tension.

$$BDV \propto [(t1)^2 \times L1]]/N \qquad (1)$$

Actually, even if the BDV is not strictly proportional to $[(t1)^2 \times L1]]/N$, the BDV becomes larger when $[(t1)^2 \times L1]]$ becomes larger. In order to downsize the multilayer ceramic capacitor and enlarge capacity of the multilayer ceramic capacitor, it is necessary to reduce "t1" and enlarge "N". Therefore, the withstand voltage becomes smaller. And so, in the embodiment, the deviation amount "L1" is enlarged. Thus, the withstand voltage BDV can be improved.

On the basis of the above-description, with respect to the dielectric layer 11 having the electrostrictive effect, the formula (1) or a correlation corresponding to the formula (1) is satisfied. And, the formula (1) is generally satisfied regardless of a pattern in which the internal electrode 12 is shifted in the Y-direction.

Figure 7:
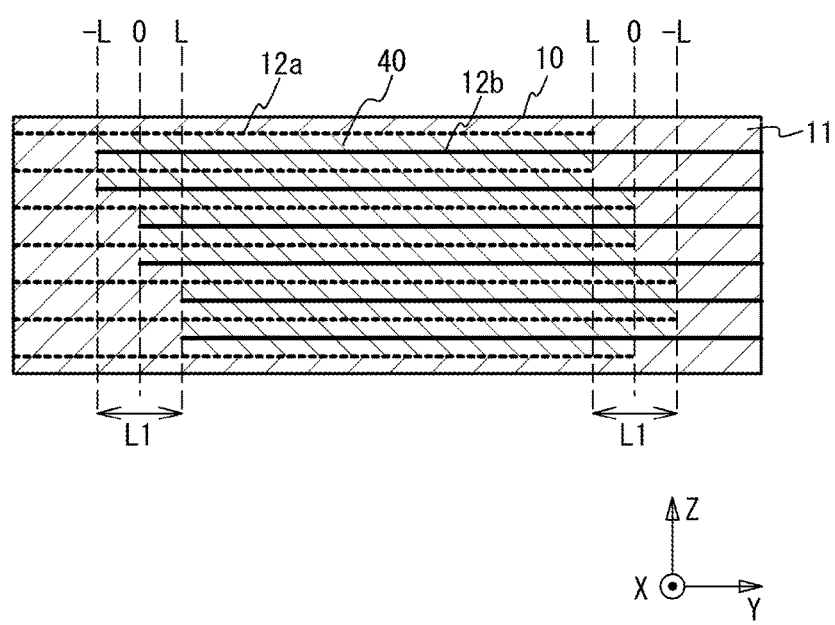
FIG. 7 illustrates a cross sectional view of a multilayer ceramic capacitor in accordance with another embodiment.

FIG. 7 illustrates a cross sectional view of the multilayer ceramic capacitor in accordance with another embodiment. As illustrated in FIG. 7, two of the internal electrodes 12a adjacent to each other and two of the internal electrodes 12b adjacent to each other are treated as one group. The position of the edges of the internal electrode 12a and the internal electrode 12b is changed to 0, L, 0 and −L in this order. In the example, in one period, sixteen dielectric layers 11 are included. The number of the dielectric layers 11 included in the group of which position of the edge is changed is arbitrary.

The number of the internal electrode 12a in the group of the position 0 may be one, and the number of the internal electrode 12b in the group of the position 0 may be one. The number of the internal electrodes 12a in the group of the positions L and the group of the position −L may be two, and the number of the internal electrodes 12b in the group of the position L and the group of the position −L may be two. In this manner, the number of the internal electrodes 12 in one group may be changed.

Moreover, the position of the edges of the internal electrodes 12a and 12b in the Y-direction may be changed in steps other than three steps such as 0, L, 2L, L, 0, −L, −2L and −L.

In the embodiment, a pair of the external electrodes 20 and 30 are provided on the faces of the multilayer structure 10 that are facing each other. The edges of the plurality of internal electrodes 12 are alternately connected to the external electrode 20 and the external electrode 30. In the multilayer ceramic capacitor, $t1^2 \times L1/N$ is equal to or more than a predetermined value. In the Y-direction (an array direction of the external electrodes 20 and 30), the outermost edge of the plurality of internal electrodes 12 that is not connected to the external electrode 20 or the external electrode 30 is the first position "Y1". In the Y-direction, the innermost edge of the plurality of internal electrodes 12 that is not connected to the external electrode 20 or the external electrode 30 is the second position "Y2". A distance between the first position Y1 and the second position Y2 is "L1" (mm). "t1" (μm) is a layer thickness of each dielectric layer 11. "N" is a stack number of the plurality of dielectric layers 11.

Thus, the stress caused by the electrostrictive effect is dispersed and the withstand voltage can be improved. It is preferable that $t1^2 \times L1/N$ is equal to or more than 0.1. It is more preferable that $t1^2 \times L1/N$ is equal to or more than 10. It is still more preferable that $t1^2 \times L1/N$ is equal to or more than 50. When $t1^2 \times L1/N$ is large, the width of the multilayer structure 10 becomes larger in the Y-direction. Therefore, it is preferable that $t1^2 \times L1/N$ is equal to or less than 100. It is more preferable that $t1^2 \times L1/N$ is equal to or less than 80.

When the electrostrictive effect of the dielectric layer 11 is large, the stress becomes larger and the withstand voltage becomes smaller. It is therefore preferable that the deviation amount "L1" is large. A sintered material of which main component is barium titanate is used as a material having large electrostrictive effect.

It is preferable that the positions of the edges of the plurality of internal electrodes 12 that are not connected to the external electrode 20 or the external electrode 30 in the Y-direction are periodically arranged. In this case, tension can be evenly dispersed. It is therefore possible to disperse the stress. And it is possible to improve the withstand voltage.

Each group has a plurality of internal electrodes 12a that have the same edge position in the Y-direction and are adjacent to each other and a plurality of internal electrodes 12b that have the same edge position in the Y-direction and are adjunct to each other. In this case, it is preferable that the edge position of group is different from each other. Thus, the tension can be evenly dispersed. It is therefore possible to evenly disperse the stress. And the withstand voltage can be improved.

The large multilayer ceramic capacitor of which operation voltage is high has a large stress caused by the electrostrictive effect. It is therefore preferable that the deviation amount "L1" is enlarged in the multilayer ceramic capacitor of which operation voltage is equal to or more than 100V or 200V. And, it is preferable that the deviation amount "L1" is enlarged in the multilayer ceramic capacitor of which length "L" and width "W" are equal to 10 mm or more.

EXAMPLES

The multilayer ceramic capacitors in accordance with the embodiment were manufactured. The main component of the internal electrode 12 and the external electrodes 20 and 30 was nickel. The main component of the dielectric layer 11 was barium titanate. Examples 1 to 9 and comparative examples 1 and 2 were manufactured. The withstand voltage BDV of the manufactured samples was measured. In the measurement of the BDV, a direct current is applied between the external electrode 20 and the external electrode 30. An increasing speed of the voltage was 50 sec/1 kV. The voltage at which the sample was broken was the withstand voltage BDV.

FIG. 8 illustrates each size of each sample of the examples and the comparative examples. As illustrated in FIG. 8, the length "L" of the multilayer structure 10 was 14 mm to 34 mm. The width "W" of the multilayer structure 10 was 19 mm to 59 mm. The thickness "T" of the multilayer structure 10 was 3.3 mm to 4.6 mm. The overlapping width "Li" of the internal electrodes 12a and 12b was 11 mm to 28 mm. The deviation amount "L1" was 1.3 mm to 2.2 mm in the examples. The deviation amount "L1" was 0.01 mm or less in the comparative examples. The end margin "EM" was 0.85 mm to 3.0 mm. The thickness "t1" of the dielectric layer 11 was 13.3 μm to 61.3 μm. The stack number N was 64 to 213.

Figure 9:
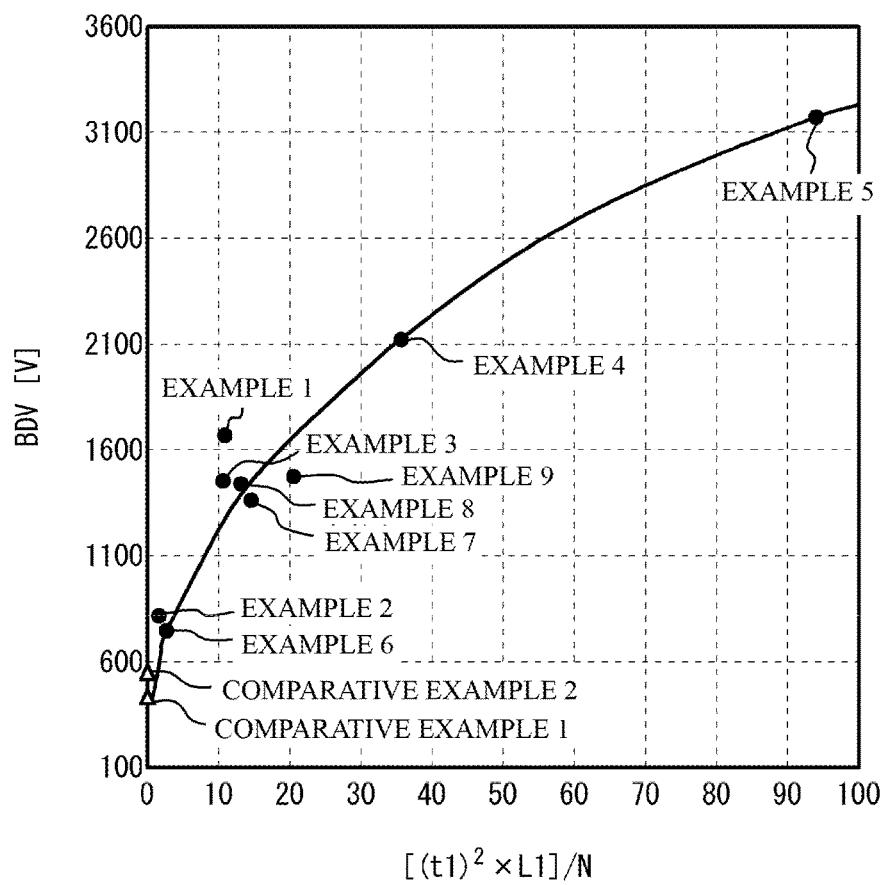
FIG. 9 illustrates a withstand voltage BDV with respect to $t1^2 \times L1/N$ of examples and comparative examples.

FIG. 9 illustrates the withstand voltage BDV with respect to $t1^2 \times L1/N$ of the examples and the comparative examples. Black circles are measured results of the examples. White triangles are measured result of the comparative examples. A solid line is an auxiliary line indicating a trend. As illustrated in FIG. 9, the withstand voltage BDV is not proportional to $[(t1)^2 \times L1]/N$ but has a good correlation with $[(t1)^2 \times L1]/N$. From the results, the withstand voltage BDV mainly depends on $[(t1)^2 \times L1]/N$ and hardly depends on another size.

In the comparative examples, the withstand voltage is approximately 500 V. When the auxiliary line is referred, the withstand voltage BDV is larger than that of the comparative examples in a case where $[(t1)^2 \times L1]/N$ is equal to or more than 0.1. When $[(t1)^2 \times L1]/N$ is equal to or more than 1, the withstand voltage is equal to or more than 600 V. The difference is significant. When $[(t1)^2 \times L1]/N$ is equal to or more than 5, the withstand voltage BDV is equal to or more than 1000V. Therefore, the withstand voltages BDV of the examples are twice or more than those of the comparative examples. When $[(t1)^2 \times L1]/N$ is equal to or more than 15, the withstand voltage BDV is equal to or more than 1500V. Therefore, the withstand voltages BDV of the examples are three times or more than those of the comparative examples. When $[(t1)^2 \times L1]/N$ is equal to or more than 30, the withstand voltage BDV is equal to or more than 2000V. Therefore, the withstand voltages BDV of the examples are four times or more than those of the comparative examples. When $[(t1)^2 \times L1]/N$ is equal to or more than 50, the withstand voltage BDV is equal to or more than 2500V. Therefore, the withstand voltages BDV of the examples are five times or more than those of the comparative examples.

As mentioned above, when $[(t1)^2 \times L1]/N$ is large, the multilayer ceramic capacitor has the high withstand voltage.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of internal electrodes and each of a plurality of dielectric layers are alternately stacked;
   a first external electrode that is provided on a first face of the multilayer structure and is connected to a subset of the plurality of internal electrodes; and
   a second external electrode that is provided on a second face of the multilayer structure and is connected to another subset of the plurality of internal electrodes, the second face facing the first face, the first external electrode and the second external electrode sandwiching the multilayer structure in an array direction,
   wherein $t1^2 \times L1/N$ is more than 5, when a distance between a first edge that is an outermost edge among edges of the plurality of internal electrodes, which edges are not connected to the first external electrode or the second external electrode in the array direction, and a second edge that is an innermost edge among the edges of the plurality of internal electrodes is L1 (*mm*), each thickness of the plurality of dielectric layers is t1 (μm), and a stack number of the plurality of dielectric layers is N, and
   the edges of the plurality of internal electrodes in the array direction included in the multilayer structure are cyclically positioned in one stack direction of the multilayer structure,
   wherein a number of the plurality of internal electrodes in the stack direction included in the multilayer structure is more than a number of the plurality of internal electrodes in the stack direction included in one cycle which is constituted by at least three different positions of the edges of the plurality of internal electrodes in the array direction.

2. The multilayer ceramic capacitor as claimed in claim 1, wherein the dielectric layer includes barium titanate.

3. The multilayer ceramic capacitor as claimed in claim 1, wherein each of the plurality of internal electrodes is alternately connected to the first external electrode and the second external electrode.

4. The multilayer ceramic capacitor as claimed in claim 1, wherein:
   the multilayer structure includes multiple groups of internal electrodes, wherein each group is constituted by plural internal electrodes that are connected to the first external electrode, have a same edge position as viewed in the stack direction, and are adjacent to each other, and plural internal electrodes that are connected to the second external electrode, have a same edge position as viewed in the stack direction, and are adjacent to each other, wherein the edge positions of the multiple groups are different from each other.

5. The multilayer ceramic capacitor as claimed in claim 1, wherein $t1^2 \times L1/N$ is equal to or more than 15.

6. The multilayer ceramic capacitor as claimed in claim 1, wherein $t1^2 \times L1/N$ is equal to or more than 50.

7. The multilayer ceramic capacitor as claimed in claim 1, wherein a plurality of first internal electrodes included in the subset and a plurality of second internal electrodes included in the another subset are alternately provided, and each of the plurality of first internal electrodes overlaps with each of the plurality of second internal electrodes in the stack direction.

* * * * *